Patented Oct. 20, 1936

2,058,209

UNITED STATES PATENT OFFICE 2,058,209

VITREOUS ENAMEL DISPERSIONS

Rudolph S. Bley, Elizabethton, Tenn., assignor to The Porcelain Enamel and Manufacturing Company of Baltimore, Baltimore, Md., a corporation of Maryland No Drawing. Application December 31, 1935, Serial No. 56,910

14 Claims. (Cl. 106—36.2)

The present invention relates to the production of vitreous enamel dispersions which may be applied to metal bases by spraying, dipping, etc.

One object of my invention has to do with a vitreous enamel dispersion, the liquid phase of which comprises an organic cobalt compound.

Another object of my invention relates to the production of vitreous enamel dispersions, the solid phase of which is dispersed in an aliphatic cobalt compound.

A third object of my invention has to do with a vitreous enamel dispersion comprising a finely divided vitreous enamel frit dispersed in an aromatic cobalt compound.

A fourth object of this invention relates to the production of vitreous enamel dispersions, the solid phase of which is dispersed in an alkyl derivative of cobalt.

A fifth object of my invention has to do with the addition of protective colloids or inert diluents to the dispersions, set forth above, to promote floating of the solid phase in the liquid phase of the dispersion.

Other objects of my invention will become apparent to those skilled in the art from a study of the following specification.

Vitreous enamel, in reality a glass composition of a relatively low fusibility, is principally composed of silicates, borates, fluorides, etc. In producing such vitreous enamel, so-called "glass-forming" substances are mixed with "auxiliary" substances in certain definite proportions to form a composition which, subsequently, is fused and quenched in water. The product, obtained after quenching, is called in the art "enamel frit". This frit is ground in water, containing clay, to a fine composition, the so-called "vitreous enamel slip" which may be applied to metal bases by spraying or dipping.

The aforementioned glass-forming substances are the following:

(1) Raw materials for introducing acid oxides (silicon, boron).

(2) Raw materials for introducing basic oxides (soda, potash, lime, magnesia, lead oxide, etc.).

(3) Raw materials for introducing acid and basic oxides (borax, fluorspar, kaolin, etc.).

The auxiliary substances, set forth above, are the following:

(1) Oxidizing agents (sodium nitrate, etc.).

(2) Adhering oxides (cobalt, nickel, manganese oxides, etc.).

(3) Opacifiers (phosphates, fluorides, pigments, etc.).

Heretofore, vitreous enamel slips have been prepared by milling enamel frit with water containing about 7% of clay to a fine consistency, said clay being added to float the frit particles by hydration. This method, however, is unsatisfactory for the reason that frit particles give off a number of alkaline compounds in the presence of water. These alkaline compounds thin out the clay of the enamel slips, and as a result the clay loses its floating property. Thus, the frit and clay particles settle in very short periods of time, and it becomes impossible to maintain a proper consistency of the enamel slip. A number of methods have been introduced to maintain or restore the consistency of enamel slips, i. e., enamel hydrosols. Acid salts, for example, magnesium sulphate, are added to enamel slips to neutralize the alkaline compounds generated by the frit particles. Although the colloidal magnesium hydroxide produced by chemical interaction of magnesium sulphate and said alkaline compounds, somewhat assists in floating the enamel particles, this so-called "setting-up" of aqueous enamel slips has proven unsatisfactory. Another method consists in adding buffer solutions to vitreous enamel slips to neutralize the alkalies, originating from the frit particles, to maintain the original optimum pH values of such slips. Although this method, set forth in my application, Serial No. 548,712, filed July, 1931, gives satisfactory results, I have found that it is extremely difficult to permanently set up "stainless" enamel frit ground in water. In addition, such enamel hydrosols form ruse on metal bases to which they are applied before firing, and as a result of such rusting so-called mottled enamel coatings are obtained. Experimentation with enamel hydrosols proved that such rusting of metal bases is caused by the alkaline compounds dissociating in the presence of water to active anions and cations. To completely overcome this deficiency, it is necessary to disperse frit particles in non- or very little conducting, organic liquids. In this manner the troublesome OH groups of alkalies are inactivated.

I am well aware that it has, heretofore, been proposed to suspend special types of enamels in oils, and to fuse such oil-enamel suspensions on metal bases, such as silver, gold, etc. However, I have found that this method to be unsatisfactory for enamelling iron, steel, etc., for the reason that oils per se burn out with the formation of gases and finely divided carbon. The gases and carbon escaping from the enamel coating upon fusing tend to cause the formation of uneven enamel coatings with so-called "pin-holes". Unexpectedly, I have found by experimentation that excellent, even vitreous enamel coatings can be produced by dispersing enamel frit in such organic liquids which do not only prevent the formation of active hydroxyl groups but which, in addition, produce upon firing such residual compounds which promote the adherence of fused enamel frit to metal bases, while blending therewith.

In accordance with my present invention, I disperse vitreous enamel frit in organic cobalt compounds which are liquid, anhydrous and stable at ordinary room temperatures. Instead of dispersing enamel frit in liquid cobalt compounds, I may suspend it in a solid, anhydrous, organic cobalt compound dissolved and/or dispersed in an anhydrous, liquid, organic compound, a so-called "inert diluent". When an enamel frit is milled with such organic cobalt compounds or dispersed therein in the total absence of water, the alkaline compounds, generated by the frit, do not form electrolytes with the cobalt compounds, the latter being practically non-conducting in anhydrous form. When such an organosol, consisting of finely divided frit and organic cobalt compounds, is applied to iron or steel plates, for example, these plates are not corroded. Therefore, the enamel coatings do not become mottled on firing and the formation of a pure, white coating, for example, is assured. In addition, the cobalt oxides formed upon firing the enamel slip onto the metal base, blend with the enamel composition and promote the adherence thereof to said metal base.

I have found that all such organic cobalt compounds may be used which are liquid and stable at ordinary room temperatures, or which are solid and soluble or dispersible in other liquid, organic compounds, such as hydrocarbons, alcohols, esters, mineral and vegetable oils, etc. Thus, I may use aliphatic and aromatic, i. e., carbocyclic and heterocyclic, cobalt compounds, having the aforementioned properties. The following table depicts a number of organic cobalt derivatives which may be used in the production of vitreous enamel dispersions, although I wish to emphasize that my invention is not limited to these compounds since others may be used with equal success.

*Table*

Diethyl cobalt
Triethyl cobalt
Dipropyl cobalt
Tripropyl cobalt
Dibutyl cobalt
Tributyl cobalt
Diamyl cobalt
Triamyl cobalt
Phenyl cobalt
Diphenyl cobalt
Triphenyl cobalt
Tolyl cobalt
Ditolyl cobalt
Tritolyl cobalt
Benzyl cobalt
Dibenzyl cobalt
Tribenzyl cobalt
Cobalt tetra carbonyl
Cobalt oleates
Cobalt stearates
Cobalt palmitates
Cobalt thiocyanates
Cobalt naphthenates
Cobalt furoates
Cobalt salts of 8-hydroxy quinoline
Cobalt salts of salicyl-aldehyde
Hexammino-cobaltic-1-nitroso-beta-naphthoxide
Cobaltic-1,2-naphthoquinone-1-oximate
1-cobaltic-7-hydroxy-1,2-naphthoquinone-1-oximate
7-pentammino-1,7-dicobaltic-7-hydroxy-1,2-naphthoquinone-1-oximate
1-cobaltic-1,2-naphthoquinone-1-oximate-3-carboxylic acid
3-pentammino-1,3-dicobaltic-1,2-naphthoquinone-1-oximate-3-carboxylate
4-pentammino-2,4-dicobaltic-1,2-naphthoquinone-2-oximate-4-sulphonate
2-cobaltic-6-acetylammino-1,2-naphthoquinone-2-oximate-3-sulphonic acid
3-pentammino-2,3-dicobaltic-6-acetylammino-1,2-naphthoquinone-2-oximate-3,6-disulphonate
8-hydroxy-1,2-naphthoquinone-2-oxime-3,6-disulphonic acid
2-cobaltic-8-hydroxy-1,2-naphthoquinone-2-oximate-3,6-disulphonic acid
3,6-dipentammino-2,3,6-tricobaltic-8-hydroxy-1,2-oximate-3,6-disulphonate
3,6,8 - tripentammino - 2,3,6,8 - tetracobaltic - hydroxy - 1,2 - naphthoquinone - 2 - oximate-3,6 - disulphonate
dl-colbalti-triethylenediamine bromide
d-cobalti-triethylenediamine-chloro-d-tartrate
dl-cobalti-triethylenediamine nitrate In addition, I may use other aliphatic and aromatic cobalt compounds which are anhydrous and stable at ordinary room temperatures.

In recent years, vitreous enamel has been produced which resists the action of acids such as contained in lemon juice, for example. These acid-resistant enamels, the so-called "stainless" enamels, are low in, or entirely free from, alumina and high in silica content (up to 50% silica). These acid-resistant enamels will settle rapidly their solid phases in water due to large amounts of alkaline compounds dissolving from the frit particles. Finally, the clay-enamel suspension becomes thinner and thinner, and the solid phases settle to a dense, hard mass. In addition, when such slips are applied to iron or steel bases, they rust these metals in very short periods of time, and it becomes impossible to produce a clear, white coating of enamel, for example, on iron or steel, and it is necessary to fuse several layers of white enamel onto these metals to camouflage the rust spots of the first coating.

I am well aware that attempts have, heretofore, been made to overcome the tendency of stainless enamel to rust iron and steel bases to which they are applied. U. S. Patent No.1,785,777 to Kinzie of December 23, 1930, for example, discloses the addition of titanium sulphate to stainless enamel slips to neutralize the alkalies generated by the same. However, this method does not allow complete prevention of rust formation on iron and steel, and it is necessary to form at least two coatings of enamel on such metals to overcome the mottling effect of stainless enamel. Yet, I have found that it is possible to form a single, white enamel coating on iron and steel provided the frit particles are not suspended in aqueous media but in anhydrous, organic cobalt compounds. Although it is possible to disperse the frit in such cobalt compounds without further additions thereto, I have found that the settling of the frit particles may be prevented for relatively long periods of time with the assistance of suitable protective colloids. Naturally, it is impossible to use such protective colloids which act in a hydrated form, such as gelatine, agar, alginates, etc., but I have found that oil-soluble soaps, such as barium, strontium, magnesium soaps, etc., produced by causing a metal salt to react with fatty acids, will effectively assist the floating of stainless enamels in organic cobalt compounds. In addition, soaps formed by chemical interaction of naphthenic acids with metal salts are suitable protective colloids for the aforementioned purpose. However, I wish to emphasize that only such soaps can be used which are somewhat soluble in organic cobalt compounds, or in organic diluents added thereto. The use of such protective colloids is naturally not limited to stainless enamel frits since any enamel frit will remain in suspension for longer periods of time in the presence of such colloids.

The amounts of vitreous enamel frit to be milled with or suspended in a given amount of a liquid, organic cobalt compound may be varied at will to form more or less viscous dispersions to which clay, protective colloids, etc., may be added. Solid organic cobalt derivatives may be dissolved in liquid ones, or they may be dissolved and/or emulsified with other stable, organic liquids, such as hydrocarbons, vegetable, mineral oils, etc., these liquids being called "inert diluents". The finished dispersions may be applied to metal bases, etc., by spraying or dipping. Before firing, the moist enamel layer is air-dried. This drying is preferably carried out in chambers which allow recovery of the vapors of the cobalt derivatives by condensation, absorption, etc.

I desire to point out that all ingredients of my vitreous enamel dispersions must be anhydrous, i. e., free from water, to prevent the formation of metal-corroding ions. Modifications of my process will be readily recognized by those skilled in the art, and I desire to include all such modifications falling within the scope of the appended claims.

I claim:

1. A dispersion comprising a finely divided vitreous enamel frit and a liquid organic cobalt compound, said compound being anhydrous and stable at ordinary room temperatures.

2. A dispersion comprising a finely divided vitreous enamel frit and a liquid aliphatic cobalt compound, said compound being anhydrous and stable at ordinary room temperatures.

3. A dispersion comprising a finely divided vitreous enamel frit and a liquid aromatic cobalt compound, said compound being anhydrous and stable at ordinary room temperatures.

4. A dispersion comprising a finely divided vitreous enamel frit and a liquid alkyl derivative of cobalt, said derivative being anhydrous and stable at ordinary room temperatures.

5. A dispersion comprising a finely divided vitreous enamel frit and a cobalt soap.

6. A dispersion comprising a finely divided vitreous enamel frit, and an organic cobalt compound and an organic diluent, said compound and said diluent being anhydrous and stable at ordinary room temperatures.

7. A dispersion comprising a finely divided vitreous enamel frit, an aliphatic cobalt compound and an organic diluent, said compound and said diluent being anhydrous and stable at ordinary room temperatures.

8. A dispersion comprising a finely divided vitreous enamel frit, an aromatic cobalt compound and an organic diluent, said compound and said diluent being anhydrous and stable at ordinary room temperatures.

9. A dispersion comprising a finely divided vitreous enamel frit, an alkyl derivative of cobalt and an organic diluent, said derivative and said compound being anhydrous and stable at ordinary room temperatures.

10. A dispersion comprising a finely divided vitreous enamel frit, a cobalt soap and an organic diluent, said soap and said diluent being anhydrous and stable at ordinary room temperatures.

11. A dispersion comprising a finely divided vitreous enamel frit, a liquid organic cobalt compound and a soap of the group consisting of metal soaps and naphthenic acid soaps, said compound and said soap being anhydrous and stable at ordinary room temperatures.

12. A dispersion comprising a finely divided vitreous enamel frit, a liquid aliphatic cobalt compound and a soap of the group consisting of metal soaps and naphthenic acid soaps, said compound and said soap being anhydrous and stable at ordinary room temperatures.

13. A dispersion comprising a finely divided vitreous enamel frit, a liquid aromatic cobalt compound and a soap of the group consisting of metal soaps and naphthenic acid soaps, said compound and said soap being anhydrous and stable at ordinary room temperatures.

14. A dispersion comprising a finely divided vitreous enamel frit, a liquid alkyl derivative of cobalt and a soap of the group consisting of metal soaps and naphthenic acid soaps, said compound and said soap being anhydrous and stable at ordinary room temperatures.

RUDOLPH S. BLEY.